United States Patent [19]

Miyoshi et al.

[11] Patent Number: 4,528,240
[45] Date of Patent: Jul. 9, 1985

[54] MAGNETIC RECORDING MEDIUM

[75] Inventors: Takahito Miyoshi, Odawara; Masaaki Fujiyama; Toshimitu Okutu, both of Minami-ashigara, all of Japan

[73] Assignee: Fuji Photo Film Co., Ltd., Minami-ashigara, Japan

[21] Appl. No.: 576,273

[22] Filed: Feb. 2, 1984

[30] Foreign Application Priority Data

Feb. 4, 1983 [JP] Japan .................................. 58-16285

[51] Int. Cl.³ .............................................. G11B 5/62
[52] U.S. Cl. .................................... 428/323; 360/134; 360/135; 360/136; 427/128; 427/131; 428/324; 428/325; 428/328; 428/329; 428/333; 428/331; 428/403; 428/404; 428/405; 428/407; 428/694; 428/695; 428/900
[58] Field of Search ............... 428/694, 695, 403, 407, 428/900, 323, 328, 329, 336, 324, 325, 330, 331, 404, 405; 427/131, 128; 360/134-136

[56] References Cited

U.S. PATENT DOCUMENTS

| 3,414,430 | 12/1968 | Maho | 428/462 |
| 4,178,405 | 12/1979 | Berkowitz | 427/131 |
| 4,183,976 | 1/1980 | Yamada | 427/130 |
| 4,210,703 | 7/1980 | Scantlin | 427/131 |
| 4,388,360 | 1/1983 | Miyoshi | 428/900 |
| 4,468,436 | 8/1984 | Okita | 427/44 |

FOREIGN PATENT DOCUMENTS 648878  9/1962  Fed. Rep. of Germany ...... 427/131

Primary Examiner—Ellis P. Robinson
Attorney, Agent, or Firm—Burns, Doane, Swecker & Mathis

[57] ABSTRACT

A magnetic recording medium includes a substrate, a magnetic layer and a subbing layer therebetween. The subbing layer includes tin oxide type powders having a mean particle size not higher than 0.8 micron. S/N ratio is improved.

17 Claims, 2 Drawing Figures

MAGNETIC RECORDING MEDIUM

FIELD OF THE INVENTION

The present invention relates to a magnetic recording medium such as video tape, audio tape, memory tape, magnetic sheet, magnetic disc, etc., and, in particular, to a magnetic recording medium having a low surface electrical resistance, an excellent adhesion between a magnetic layer and a substrate or support, and good durability.

BACKGROUND OF THE INVENTION

Most substrates or supports of recently developed magnetic recording medium comprise polyethylene terephthalate. Polyethylene terephthalate has a high resistance against organic solvents and excellent mechanical strength because of stretching and high crystallization. The magnetic layer obtained by coating a composition comprising ferromagnetic fine particles dispersed in a binder is mechanically very brittle. Thus such a magnetic layer having an ordinary thickness directly applied onto the substrate without interposing an undercoat or subbing layer therebetween will be readily broken on exerting a slight force. It is very difficult to firmly adhere such magnetic layer to the substrate. Accordingly it is the easiest and the most effective solution that an undercoat or subbing layer is provided between the substrate and the magnetic layer as is done in painting technology.

In order to provide a high density magnetic recording medium having good running properties and an excellent adhesion it is necessary for the magnetic layer to have a low surface electrical resistance and an excellent adhesion without impairing its surface smoothness and the like. With respect to subbing arts, there are known arts as are disclosed in Japanese Patent Publication Nos. 47(1972)-220071 and 49(1974)-10243, Japanese Patent Kokai-Publication Nos. 49(1974)-46406, 49(1974)-46407, 50(1975)-32905, 50-32906 and 50-32907, etc. However these arts have both merits and demerits and do not always meet sufficiently the aforementioned requirements as subbing compositions.

SUMMARY OF THE DISCLOSURE

It is therefore an object of the present invention to provide a novel magnetic recording medium including a subbing layer which eliminates the aforementioned disadvantages.

The object of the present invention is accomplished by providing a magnetic recording medium comprising a substrate, a subbing layer thereon, and a magnetic layer applied onto the subbing layer, wherein the subbing layer includes tin oxide type powders having a mean particle size not higher than 0.8 micron.

Conventional magnetic layers include, besides magnetic powders, a considerable amount of electrically conductive particles such as carbon black providing the layer with electrical conductivity. In accordance with the present invention, the snubbing layer having an improved electrical conductivity may considerably decrease the amount of the carbon black powder in the magnetic layer. This results in a high packing density of magnetic particles in the magnetic layer, enabling an improvement in the electromagnetic conversion characteristics.

DETAILED DESCRIPTION OF THE PREFERRED EMBODIMENTS

Figure 1:
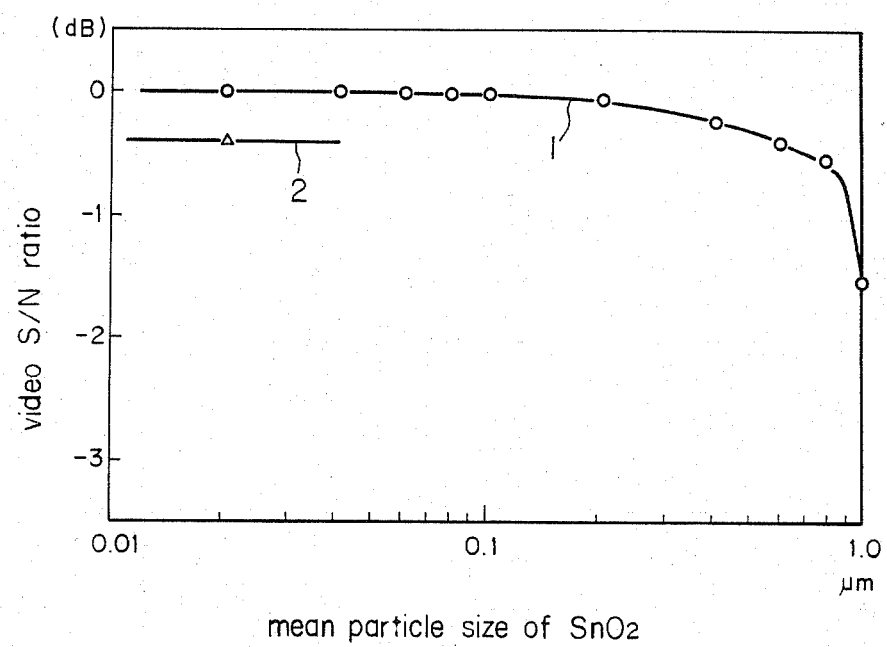
FIG. 1 is a graph showing the relation between the mean particle size of tin oxide type powders and the video S/N ratio in which curve 1 represents the examples of the present invention whereas curve 2 represents a comparative example in which the subbing layer includes no tin oxide powders.

A subbing layer in the present invention preferably has a thickness of 0.03–0.3 micron, more preferably 0.05–0.2 micron. When the thickness of the subbing layer is lower than 0.03 micron, the subbing layer cannot effectively mitigate the stress concentration resulting in lowering the adhesion of the magnetic layer to the substrate. In case where the thickness of the subbing layer exceeds 0.3 micron it is difficult to provide a smooth finished surface of the subbing layer and, in turn, the magnetic layer so that it makes impossible to provide magnetic tapes having a high S/N ratio.

Tin oxide type powders which are added to the subbing layer as a filler in the present invention include (i) powders consisting of only $SnO_2$, (ii) coated powders of a material other than tin oxide, such as $TiO_2$, which are coated with tin oxide, (iii) tin oxide powders which are dispersed in a colloidal state together with other powders such as $BaSO_4$, (iv) tin oxide powders doped with a material such as $SbO_2$ or $Sb_2O_3$, and (v) a mixture of any combination of powders (i)-(iv).

The tin oxide type powders may be present mixed with the powders of other inorganic materials. Examples of such inorganic materials are carbon black, graphite, tungsten disulfide, molybdenum disulfide, boron nitride, silicon dioxide, calcium carbonate, aluminum oxide, iron oxide, titanium dioxide, magnesium oxide, zinc oxide, calcium oxide, lithopone and talc.

In this case the tin oxide type powders are preferably not less than 20 weight %, more preferably not less than 40 weight % of the total inorganic powders including the other inorganic pigment powders.

The tin oxide-coated powders other than tin oxide include the same as hereinabove mentioned for the inorganic materials that may be present with tin oxide.

Inorganic material powders (including tin oxide powder) used in the present invention preferably have a mean particle size of 0.01–0.8 micron, more preferably 0.02–0.4 micron. This is due to the fact that excessively large convexes and recesses are formed upon the subbing layer if the mean particle size exceeds 0.8 micron, the peaks and valleys influencing even the magnetic layer surface resulting in impaired electromagnetic conversion characteristics.

It is preferable that the ratio by volume of the total inorganic powders to the binder be 1:99–60:40, more preferably 5:95–50:50, most preferably 10:90–40:60. This is due to the fact that the adhesion is remarkably decreased when the powder volume exceeds 60% and that the frequency of dropouts will increase when the powder volume is less than 1%.

The ratio by volume of tin oxide powders to binder in the inorganic powder is preferably 1:99–70:30, more preferably 10:90–30:70. This is due to the fact that the electrical conductivity of the subbing layer decreases when the amount of tin oxide type powder is excessively low.

The binder which is used in the subbing layer includes binders known in the art, e.g., thermoplastic resins, solely or mixtures thereof.

The thermoplastic resin includes a vinyl chloride-vinyl acetate copolymer, a vinyl chloride-vinylidene copolymer, a vinyl chloride-acrylonitrile copolymer, an acrylic acid ester-acrylonitrile copolymer, an acrylic acid ester-vinylidene chloride copolymer, an acrylic acid ester-styrene copolymer, a methacrylic acid ester-acrylonitrile copolymer, a methacrylic acid ester-vinylidene chloride copolymer, a methacrylic acid ester-styrene copolymer, a urethane elastomer, polyvinyl fluoride, a vinylidene chloride-acrylonitrile copolymer, a butadiene-acrylonitrile copolymer, a polyamide resin, a polyvinyl butyral, a cellulose derivative (e.g., cellulose acetate butyrate, cellulose diacetate, cellulose propionate, nitrocellulose, etc.), a styrene-butadiene copolymer, a polyester resin, a chlorovinyl ether-acrylate copolymer, amino resin, various synthetic rubber type resins, polyisocyanate, etc.

The prior disclosures relating to the binder of the subbing layer are Japanese Patent Publication Nos. 57(1982)-42891 and 57(1982)-42890.

The magnetic layer used in the present invention is a coating type magnetic layer coated upon the subbing layer by a process comprising the steps of applying a magnetic coating to the subbing layer; and orienting the applied coating; and drying it. The magnetic coating is prepared by kneading and dispersing finely divided ferromagnetic materials, with and in binders, additives and solvent.

The processes of producing the magnetic coating used for the coating type magnetic layer are disclosed in detail in Japanese Patent Publication Nos. 35-15; 39-26794 43-186; 47-28043; 47-28045; 47-28046; 47-28048; 47-31445; 48-11162; 48-21331; 48-33683, Soviet Union's Patent Specification No. 308,033; U.S. Pat. Nos. 2,581,414; 2,855,156; 3,240,621; 3,525,598; 3,728,262; 3,790,407; and 3,836,393, etc. The magnetic coatings disclosed in the reference includes mainly finely divided ferromagnetic material, binder and solvent as main components and may include additives such as dispersing agents, lubricant, abrasive material, anti-static agents, etc.

The finely divided ferromagnetic material includes ferromagnetic iron oxide, ferromagnetic chrome dioxide, and ferromagnetic alloy powders.

The ferromagnetic iron oxide is represented by a general formula $FeO_x$ wherein x is in a range from 1.33 to 1.50. That is, it includes maghemite ($\ominus-Fe_2O_3$, $x=1.50$) magnetite ($Fe_3O_4$, $x=1.33$), and bertholide compounds of those ($FeOx$, $1.33<x<1.50$). The value of x is represented by a formula $$x=(1/200)\{2\times(\text{atomic\% of divalent})+3\times(\text{atomic\% of trivalent iron})\}$$

These ferromagnetic iron oxides may be added with a divalent metal. The divalent metal includes Cr, Mn, Co, Ni, Cu, Zn, or the like and is added to the iron oxides at a range of 0-10 atomic %.

As the ferromagnetic chrome dioxide, $CrO_2$ and an alloy of $CrO_2$ which is added with 0-20 weight % of a metal such as Na, K, Ti, V, Mn, Fe, Co, Ni, Tc, Ru, Sn, Ce, Pb and a semiconductor such as P, Sb, Te, and an oxide of these metals.

Ferromagnetic iron oxide and ferromagnetic chrome dioxide having an acicular ratio (length/short diameter) of about 2/1 to 20/1, preferably not less than 5/1 and an average length of about 0.2–2.0 microns may be used.

The aforementioned ferromagnetic powders includes 75 weight % or more of metal content. Said metal content includes 80 weight % or more of at least one ferromagnetic metal (namely, Fe, Co, Ni, Fe-Co, Fe-Ni, Co-Ni, Co-Ni-Fe or the like), while 20 weight % or less, preferably 0.5 to 5 weight % of a material such as Al, Si, S, Sc, Ti, V, Cr, Mn, Cu, Zn, Y, Mo, Rh, Pb, Ag, Sn, Sb, Te, Ba, Ta, W, Re, Au, Hg, Pb, Bi, La, Ce, Pr, Nd, B and/or P. The ferromagnetic powders may include a small amount of water, hydroxide, or oxide.

The ferromagnetic alloy powder include particles having a length of not less than about 0.5 micron.

The magnetic recording medium preferably uses the ferromagnetic alloy powders hereinabove mentioned.

The ferromagnetic alloy powders are specifically disclosed in Japanese Patent Publication Nos. 36-5515; 37-4825; 39-5009; 39-10307; 44-14090; 45-18372; 47-22062; 47-22513; 46-28466; 46-38755; 47-4286; 47-12422; 48-17284; 47-18509; 47-18573; 48-39639; U.S. Pat. Nos. 3,026,215; 3,031,341; 3,100,194; 3,242,005; 3,389,014; British Pat. Nos. 752,659; 782,762; 1,007,323; and French Pat. No. 1,107,654 and West German Laid-open Patent DE-OS No. 1,281,334.

Examples of binders which can be used in the present invention includes thermoplastic resins, thermosetting resins or reaction type resins, (those resins may be known resins or a mixture thereof).

Preferred thermoplastic resins include those having a softening point of about 150° C. or less and a means molecular weight of about 10,000–200,000 and a polymerization degree of about 200 to 2,000, examples of which include a vinyl chloride-vinyl acetate copolymer, a vinyl chloride-vinylidene chloride copolymer, a vinyl cloride-acrylonitrile copolymer, an acrylic acid ester-acrylonitrile copolymer, acrylic acid ester-vinylidene chloride copolymer, acrylic acid ester-styrene copolymer, a methacrylic acid ester-acrylonitrile copolymer, methacrylic acid ester-vinylidene chloride copolymer, a methacrylic acid ester-styrene copolymer, an urethane elastomer, polyvinyl fluoride, a vinylidene chloride-acrylonitrile copolymer, a butadiene-acrylonitrile copolymer, a polyamide resin, a polyvinyl butyral, cellulose derivatives (e.g., cellulose acetate butyrate, cellulose diacetate, cellulose triacetate, cellulose propionate, nitro-cellulose, etc.), a styrene-butadiene copolymer, polyester resins, various synthetic rubber type thermoplastic resins (polybutadiene, polychloroprene, polyisoprene, a styrene-butadiene copolymer) and mixtures thereof, etc.

Examples of these resins are disclosed in Japanese Patent Publication Nos. 37-6877, 39-12528, 39-19282, 40-5349, 40-20907, 41-9463, 41-14059, 41-16985, 42-6428, 42-11621, 43-4623, 43-15206, 44-2889, 44-17947, 44-18232, 45-14020, 45-14500, 47-18573, 47-22063, 47-22064, 47-22068, 47-22069, 47-22070, and 48-27886; and U.S. Pat. Nos. 3,144,352, 3,419,420 and 3,499,789, etc.

Preferred thermosetting resins or reaction type resins have a molecular weight of not higher than 200,000 in the state of a coating solution, but the molecular weight thereof becomes essentially infinite due to reactions such as condensation, addition, etc., after coating and drying. Further, of these resins, resins which do not soften or melt until they are heat decomposed are preferred. Specific examples of these resins are, for example, phenol formalin—novolak resins, phenol.formalin—resol resins, phenol furfural resins, xylene.formaldehyde resins, urea resins, melamine resins, drying oil-modified alkyd resins, phenolic resin-modified alkyd resins, maleic acid resin-modified alkyd resins, unsaturated polyester resins, epoxy resin-curing agent (polyamine, acid anhydrides, polyamide resins, etc.) combinations, isocyanate terminated polyester moisture curable resins, isocyanate terminated polyether moisture curable resins, polyisocyanate prepolymers (compound having 3 or more isocyanate groups in one molecule, which is obtained by reacting diisocyanate with low-molecular triol, and trimer and tetramer of diisocyanate), resins having a polyisocyanate prepolymer and active hydrogen (polyesterpolyol, polyetherpolyol, acrylic acid copolymers, maleic acid copolymers, 2-hydroxyethylmethacrylate copolymers, parahydroxystyrene copolymers, etc.) and mixtures thereof, etc.

Details on these resins are given in Japanese Patent Publication Nos. 39-8103, 40-9779, 41-7192, 41-8016, 41-14275, 42-18179, 43-12081, 44-28023, 45-14501, 45-24902, 46-13103, 47-22065, 47-22066, 47-22067, 47-22072, 47-22073, 47-28045, 47-28048, and 47-28922, U.S. Pat. Nos. 3,144,353, 3,320,090, 3,437,510, 3,597,273, 3,781,210 and 3,781,211, etc.

These binders can be used alone or in combination, and may contain additives. The binders are used within a range such that the mixing ratio of ferromagnetic powder(s) to the binder is about 8 to about 400 parts by weight, preferably 10 to 200 parts by weight, of the binder per 100 parts by weight of the ferromagnetic powder(s).

To the magnetic recording layer, dispersing agents, smoothening agents, abrasives, antistatic agents, etc., can be added, in addition to the aforementioned binders and ferromagnetic powders.

Examples of dispersing agents are fatty acids having 12 to 18 carbon atoms ($R_1COOH$ wherein $R_1$ is an alkyl or alkenyl group having 11 to 17 carbon atoms) such as caprylic acid, capric acid, lauric acid, myristic acid, palmitic acid, stearic acid, oleic acid, elaidic acid, linolenio acid, linoleic acid, stearolic acid, etc.; metallic soaps comprised of alkali metal (Li, Na, K, etc.) salts or alkaline earth metal (Mg, Ca, Ba) salts of the aforementioned fatty acids; fluorine-containing compounds of the aforementioned fatty acid esters; amides of the aforementioned fatty acids; polyalkylene-oxide-alkyl phosphoric acid esters; lecithin; trialkylpolyolefin oxy quaternary ammonium salts (wherein the alkyl group has 1 to 5 carbon atoms and the olefin is ethylene, propylene, etc.), etc. In addition higher alcohol having 12 or more carbon atoms such as sulfonic acid esters of these higher alcohols can also be used. These dispersing agents are employed by adding within a range of from about 0.5 to about 20 parts by weight per 100 parts of the binder. Details as given in Japanese Patent Publication Nos. 39-28369, 44-17945, 48-7441, 48-15001, 48-15002, 48-16363 and 50-4121, U.S. Pat. Nos. 3,387,993 and 3,470,021; etc.

Examples of lubricants which can be used include silicone oil such as a dialkyl polysiloxane (wherein the alkyl group has 1 to 5 carbon atoms), a dialkoxy polysiloxane (wherein the alkoxy group has 1 to 4 carbon atoms), a monoalkyl monoalkoxy polysiloxane (wherein the alkyl group has 1 to 5 carbon atoms and the alkoxy group has 1 to 4 carbon atoms), phenyl polysiloxane, a fluoroalkyl polysiloxane (wherein the alkyl group has 1 to 5 carbon atoms), etc.; electroconductive powders such as graphite, etc.; inorganic powders such such as molybdenum disulfide, tungsten disulfide, etc.; plastic powders such as polyethylene, polypropylene, a polyethylene-vinyl chloride copolymer, polytetrafluoroethylene, etc.; $\alpha$-olefin polymers; unsaturated aliphatic hydrocarbons which are liquid at normal temperature (compounds having an $\alpha$-olefinic double bond bonded to the carbon at the terminal thereof, and containing about 20 carbon atoms); a fatty acid ester comprising a monobasic fatty acid having 12 to 20 carbon atoms and a monovalent alcohol having 3 to 12 carbon atoms; etc. These lubricants are added in an amount of about 0.2 to about 20 parts by weight per 100 parts by weight of the binder. These lubricants are described in detail in Japanese Patent Publication Nos. 34-29709, 38-11033, 43-23889, 46-40461, 47-15621 47-18482, 47-28043, 47-30207, 47-32001, 48-7442, 49-14247, 50-5042, 52-14082 and 52-18561; Japanese Patent Kokai-Publication Nos. 52-8804, 52-49803, 52-49804, 52-49805, 52-67304 and 52-70811; U.S. Pat. Nos. 2,654,681, 3,470,021, 3,492,235, 3,497,411, 3,523,086, 3,625,760, 3,630,772, 3,634,253, 3,642,539, 3,687,725, 3,996,407, 4,007,313, 4,007,314, 4,018,967, 4,018,968; IBM Technical Disclosure Bulletin, Vol. 9, No. 7 page 779 (December 1966); ELEKTRONIK, 1961, No. 12, page 380; etc.

As abrasives, there are used those which are generally employed in this art including: fused alumina, silicon carbide,, chromium oxide ($Cr_2O_3$), corundum, synthetic corundum, diamond, synthetic diamond, garnet, emery (main components; corundum and magnetite), etc. These abrasives have a Mohs hardness of not less than 5 and a means particle size of about 0.05 to about 5 microns, preferably 0.1 to 2 microns. These abrasives are added in an amount of about 0.5 to about 20 parts by weight per 100 parts by weight of the binder. Details thereon are given in Japanese Patent Publication Nos. 47-18572, 48-15003 and 48-15004 (U.S. Pat. No. 3,617,378), 49-39402 and 50-9401; U.S. Pat. Nos. 3,007,807, 3,041,196, 3,293,066, 3,630,910, 3,687,725 and 4,015,042; British Pat. No. 1,145,349; German Pat. Nos. (DT-PS) 853,211 and 1,101,000; etc.

Examples of antistatic agents which can be used include electroconductive fine powders such as carbon black, carbon black graft polymers; natural surfactants such as saponin, etc.; nonionic surfactants such as alkylene oxide type, glycerine type, glycidol type, etc.; cationic surfactants such as higher alkylamines, quaternary ammonium salts, pyridine or other heterocyclic ring compounds, phosphonium or sulfonium, etc; anionic surfactants containing an acid group such as a carboxylic acid, sulfonic acid, phosphoric acid, sulfuric acid ester, group, etc. amphoteric surfactants such as amino acid, aminosulfonic acid, sulfuric acid- or phosphoric acid esters of aminoalcohols, etc.

The electroconductive powders are added in an amount of 0.2 to 20 parts by weight per 100 parts by weight of the binder and the surfactants are added in an amount of 0.1 to 10 parts by weight per 100 parts by weight of the binder.

Some electroconductive powders and surfactants which can also be used as antistatic agents are described in Japanese Patent Publication Nos. 46-22726, 47-24881, 47-26882, 48-15440 and 48-26761; Japanese Pat. Kokai-Publication Nos. 52-18561 and 52-38201; U.S. Pat. Nos. 2,271,623, 2,240,472, 2,288,226, 2,676,122, 2,676,924, 2,676,975, 2,691,566, 2,727,860, 2,730,498, 2,742,379, 2,739,891, 3,068,101, 3,158,484, 3,201,253, 3,210,191, 3,294,540, 3,415,649, 3,441,413, 3,442,654, 3,475,174 and 3,545,974; German Patent Laid-open Publication (DE-OS) 1,942,665; British Pat. Nos. 1,077,317 and 1,198,450; Ryohei Oda et al, Kaimen Kasseizai no Gosei to sono Oyo (Synthesis of Surface Active Agents and Their Application), 1964, published by Maki Shoten; A. M. Schwartz & J. W. Perry, Surface Active Agents, 1958, published by Interscience Publication Incorporated; J. P. Sisley, Encyclopedia of Surface Active Agents, vol. 2, 1964, published by Chemical Publishing Company; Kaimen Kasseizai Binran (Handbook of Surface Active Agents), sixth ed., Dec. 20, 1966, published by Sangyo Tosho Kabushiki Kaisha, etc.

These surfactants may be added alone or in combination. They are used as antistatic agents, but they may also be utilized sometimes for other purposes, for example, for dispersion, improvement of magnetic characteristics, improvement of lubricity or as a coating aid.

Examples of organic solvents which can be used for coating are ketone type solvents such as acetone, methyl ethyl ketone, methyl isobutyl ketone, cyclohexanone, etc; alcohol type solvents such as methanol, ethanol, propanol, butanol, etc.; ester type solvents such as methyl acetate, ethyl acetate, butyl acetate, ethyl lactate, glycol acetate monoethyl ether, etc.; ether and glycol ether type solvents such as ether, glycol dimethyl ether, glycol monoethyl ether, dioxane, etc.; tar (aromatic hydrocarbon) type solvents such as benzene, toluene, xylene, etc.; and chlorinated hydrocarbon such as methylene chloride, ethylene chloride, carbon tetrachloride, chloroform, ethylene chlorohydrin, dichlorobenzene etc. which can be used alone or in combination.

To prepare a magnetic coating material, the magnetic powders, the binder, dispersing agents, lubricants, abrasives, antistatic agents, solvent and the like are kneaded.

On kneading them with each other, the magnetic powders and the aforementioned ingredients are simultaneously or successively charged into a kneading machine. For example, the magnetic powders are added to a solvent containing the dispersant, followed by kneading continued for a given period of time to prepare a magnetic coating material.

For kneading (dispersion) of the magnetic coating material, various kneading machines can be used. For instance, there are a twin-roll mill, a triple-roll mill, a ball mill, pebble mill, a trommel, a sand grinder, a Szegvari attritor, a high speed impeller dispersing machine, a high speed stone mill, a high speed impact mill, a disper, a kneader, a high speed mixer, a homogenizer, an ultrasonic dispersing machine, and the like.

Technology regarding kneading (dispersion) is disclosed in T. C. Patton, Paint Flow and Pigment Dispersion, 1964, published by John Wiley & Sons, and also disclosed in U.S. Pat. Nos. 2,581,414 and 2,855,156.

The process for coating the magnetic recording layer on the support includes air doctor coating, blade coating, air knife coating, squeeze coating, impregnation coating, reverse roll coating, transfer roll coating, gravure coating, kiss coating, cast coating, spray coating, spin coating and other coating manners. The details are described in "Coating Engineering" published Mar. 20, 1971 by Asakura Shoten, on pages 253–277.

A double magnetic layers may be formed by coating a magnetic layer on a non-magnetic substrate by one of the aforementioned coating processes and drying the coating layer and then repeating such steps.

Alternatively the double magnetic layers may be simultaneously provided by a simultaneous multilayer coating manner which is described in Japanese Pat. Kokai Publication Nos. 48-98803 and 48-99233 (German Laid-open Pat. Publications DT-OS No. 2,309,159, and DT-AS No. 2,309,158, respectively), etc.

The coating material is applied onto the subbing layer to form a magnetic layer of about 0.8 to 10 microns, preferably 1 to 5 microns in a dry state. It is difficult to coat the layer having an uniform thickness below 0.8 microns. It is not preferred to exceed 10 microns since the total thickness of the tape becomes excessively thick. In case of dual layers, the total thickness thereof falls in the aforementioned range. The thickness of the dried magnetic layer is determined depending on the use, shapes and standards of the magnetic recording medium.

The magnetic layer coated upon the substrate by any of the manners aforementioned is dried, if necessary, after orienting the ferromagnetic powders in the layer. If necessary, a surface smoothening treatment is performed and/or cutting of the resultant product into a desired shape is performed to produce a magnetic recording medium of the present invention.

It has been confirmed that surface smoothening treatment provides the magnetic layer with a smooth surface and an excellent resistance against wear. This surface smoothening treatment is performed by a smoothening treatment step before drying of the layer or by a calendering treatment after drying.

The orientation treatment is performed under the magnetic field for orientation having about 500 to 300 Oe (direct current or alternating current).

The direction of the orientation of the magnetic material is determined depending upon its use. That is, in the case of a sound tape, a compact video tape, a memory tape, etc., the direction for orientation is parallel to the longitudinal direction of the tape; in the case of a video tape for broadcasting, orientation is performed at an angle of 30° to 90° C. to the longitudinal direction.

Processes for orientation of the magnetic powders are also disclosed in the following patents: U.S. Pat. Nos. 1,949,840, 2,796,359, 3,001,891, 3,172,776, 3,416,949, 3,473,960 and 3,681,138 and Japanese Patent Publication Nos. 32-3427, 39-28368, 40-23624, 40-23625, 41-13181, 48-13043 and 48-39722, etc.

In case of double layers, the direction of the orientation of the upper layer may be made different from that of the lower layer as is described in Japanese Pat. Kokai-Publication No. 52-79905, U.S. Pat. No. 3,775,178 and West German Pat. Publication (DT-AS) No. 1,190,985.

The drying temperature of the magnetic layer after orientation is about 50° to about 120° C., preferably 70 to 100° C., more preferably 80° to 90° C. The air flow rate is 1 to 5 kl/m$^2$, preferably 2 to 3 k/m$^2$. The drying period of time is about 30 seconds to about 10 minutes, preferably 1 to 5 minutes.

The smoothening treatment of the coating layer surface before drying of the magnetic layer is performed by means of a magnet smoother, a smoothening coil, a smoothening blade, a smoothening blanket, etc. These means are disclosed in Japanese Pat. Publication Nos. 47-38802, 48-11336, British Pat. No. 1,191,424; and Japanese Pat. Kokai-Publication Nos. 49-53631, 50-112005 and 51-77303.

The calendering treatment of coated layer surface after drying of the magnetic layer is preferably performed by a super calendering method in which the magnetic medium is passed through between two rolls such as a pair of metal-cotton rolls, synthetic resin (for example, nylon, polyurethane, etc.) rolls, or metal-metal rolls. The super calendering treatment should be performed under conditions of a pressure between rollers of about 25 to 50 kg/cm, a temperature of about 35° to 150° C. and a treatment speed of 5 to 200 m/min. When the temperature and the pressure exceeds the maximum limits an adverse influence affects the magnetic layer and non-magnetic substrate. When the treatment speed is below about 5 m/min, there would be no surface smoothening effects, whereas, exceeding 200 m/min, the treatment operation becomes difficult.

The surface smoothening treatment technology is disclosed in U.S. Pat. Nos. 2,688,567; 2,998,325; and 3,783,023, German Laid-open Pat. Publication DE-OS 2,405,222, Japanese Patent Kokai-Publication Nos. 49-53631, 50-10337, 50-99506, 51-92606, 51-102049, 51-103404, Japanese Pat. Publication No. 52-17404.

The substrate of the present invention may be provided with so-called backcoat at one end side (back surface) opposite to the magnetic layer for preventing electrostatic charging, transferring of surface irregularities and wow fluttering, and for improving the strength of the magnetic recording medium and matting the back surface.

The present invention will be described in details with reference to examples and comparative examples. It is readily understood by those skilled in the art that the ingredients, ratios, operations and procedures may be changed within the spirit and scope of the present invention. It is also readily understood that the present invention is applicable to other uses such as video tapes, floppy disks, etc. Therefore the present invention should not be restricted to only the following examples. In the examples and comparative examples all parts are by weight.

EXAMPLES

A polyethylene terephthalate substrate of 14 microns was coated with a subbing layer and dried by passing through dry air of 100° C., followed by coating with a magnetic layer. The resultant tape was passed through a magnetic field of 2000G for orientation and dried in dry air of 100° C. resulting in a sample tape.

The composition for the magnetic layer was as follows:

Maghemite $\gamma$-$Fe_2O_3$ (Hc=400 Oe, mean particle size: 0.5 micron, acicular ratio: 10/1)—300 parts
Vinyl Chloride/vinyl acetate/vinyl alcohol copolymer (copolymerization ratio: 92/3/5 (by weight), polymerization degree: 420)—56 parts
Polyesterpolyurethane (synthesized from butylene adipate and diphenyl methanediisocyanate, molecular weight: about 80,000)—24 parts
Electroconductive carbon black (mean particle diameter: 30 milli-microns)—3 parts
Myristic acid—4 parts
Silcone oil (dimethylpolysiloxane, polymerization degree: 60)—0.3 parts
Methylethylketone—500 parts
Cyclohexanone—200 parts The aforementioned composition was charged into a ball mill, in which the composition was mixed for dispersing for 24 hours. To the resultant Desmodur L-75 (an aduct of three molar trilenediisocyanate with one molar trimethylol propane, 75 wt % of ethyl acetate solution, manufactured by Bayer A.G.) was added in an amount of 20 parts into the mill. Then high speed shearing dispersing was conducted for one hour, followed by filtering through a filter having a mean pore diameter of 3 microns to provide a magnetic coating material.

The binder composition for the subbing layer was as follows:

Polyester resin (STAFIX manufactured by Fuji Photo Film K.K.)—10 parts
MEK—200 parts
toluene—200 parts
$SnO_2$ powders*—a given amount**

Figure 2:
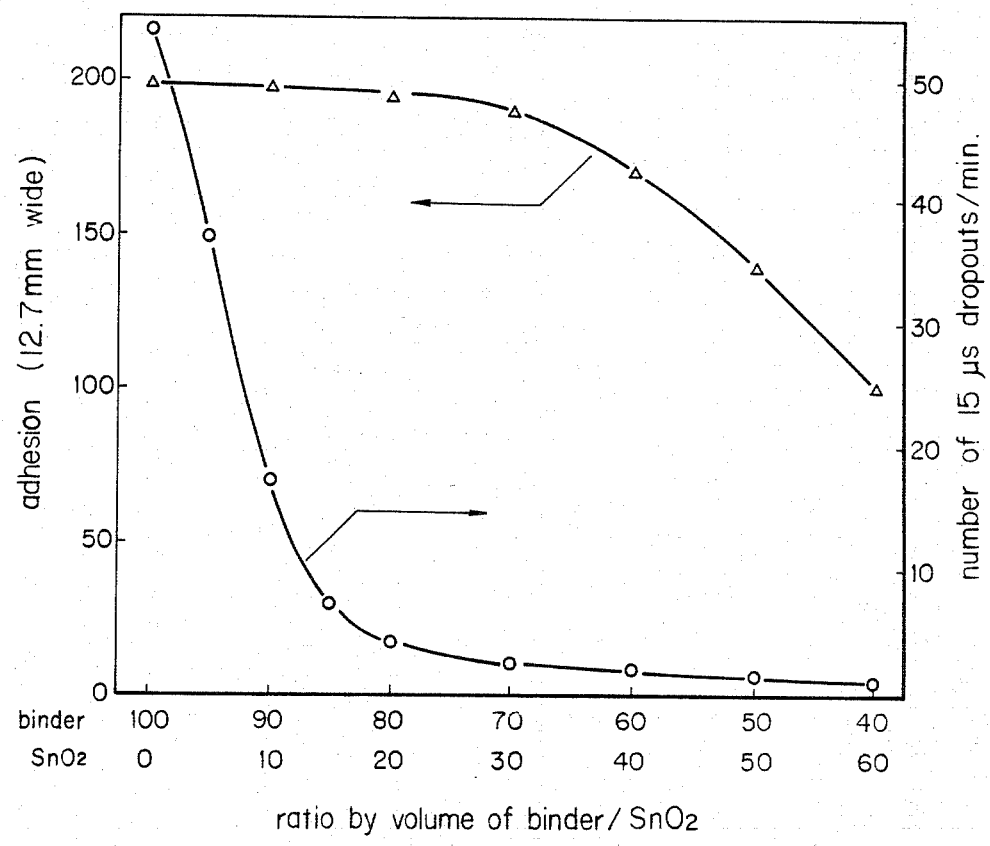
FIG. 2 is a graph showing the relations of the adhesion between the substrate and magnetic layer and the number of dropouts with the volume ratio of binder/tin oxide.

*The changes in video S/N ratio were measured (curve 1) while the mean particle size of the $SnO_2$ powders were changed from 0.02 to 1.0 micron as shown in FIG. 1, wherein the volume ratio of the binder (polyester resin) to $SnO_2$ was maintained at 70:30. The video S/N ratio (curve 2) shows the case where 10 parts of carbon black was charged into the magnetic layer including no $SnO_2$ powders formed on the subbing layer is shown in FIG. 1 for the sake of comparison.
**FIG. 2 shows changes in the adhesion (represented by triangle marks) and the number of dropouts (represented by circle marks) which were measured toward the change in the ratio of the $SnO_2$ powders to binder (polyester resin). The mean particle size of the used $SnO_2$ was 0.1 micron.

The samples of the magnetic recording media which were subjected to tests shown in FIGS. 1 and 2 had a subbing layer thickness of 0.2 micron and a magnetic layer thickness of 5 microns.

The measurements were made as follows:
Test of video S/N ratio

A noisemeter Model 925C manufactured by Shibasoku K.K. was used as a measuring instrument. A tape having a subbing layer including 0.04 micron $SnO_2$ powders was used as a reference tape. The S/N ratios of the sample and reference tapes were determined by measuring the noise level of each tape by using a 10 MHz high pass filter and 4 MHz low pass filter, wherein a VTR model NV-8300 manufactured by the Matsushita Electric Industry Co., Ltd was used.

Test of Adhesion of the magnetic layer to the substrate

Friction pull tests were performed (JIS K6744-1963, ASTM D903-49(1965)), in which an adhesive tape was uniformly adhered on the magnetic layer of a magnetic tape having a width of 12.7 mm (½ inch). A friction pull force was applied at an angle of 180° to either one of the tapes to separate each other at a temperature of 23° C. and relative humidity of 65°.

Test of dropouts

The number of dropouts having a duration of 15 microsecond or more occurred for one minute was measured by means of a dropout counter Model VD-3D manufactured by Victor Japan Co., Ltd.

FIGS. 1 and 2 show that a tape having excellent electromagnetic conversion characteristics and a reduced number of dropouts can be obtained by adding $SnO_2$ powders having a particle size not higher than 0.8 micron into the subbing layer.

What is claimed is:

1. A magnetic recording medium including a substrate, a magnetic layer, and a subbing layer therebetween wherein said subbing layer has a thickness of 0.03 to 0.08 micron, and includes tin oxide type powders having a mean particle size of not higher than 0.08 micron and an organic binder in a ratio, by volume of the tin oxide type powder to the binder, of 1:99 to 70:30.

2. A magnetic recording medium as defined in claim 1 in which the tin oxide type powders include powders selected from the group consisting of powders of tin oxide, tin oxide-coated powders of a material other than tin oxide, colloidally dispersed tin oxide powders, and powders of tin oxide doped with $SbO_2$ or $Sb_2O_3$.

3. A magnetic recording medium as defined in claim 2, in which said material other than tin oxide of the oxide-coated powders are one or more selected from the group consisting of carbon black, graphite, tungsten disulfide, molybdenum disulfide, boron nitride, silicon dioxide, calcium carbonate, aluminum oxide, iron oxide, titanium dioxide, magnesium oxide, zinc oxide, calcium oxide, lithopone and talc.

4. A magnetic recording medium as defined in claim 2, in which said colloidally dispersed tin oxide powders are dispersed together with $BaSO_4$.

5. A magnetic recording medium as defined in claim 1 in which said subbing layer further includes powders of inorganic pigment material other than the tin oxide type powders.

6. A magnetic recording medium as defined in claim 5 in which the amount of the tin oxide type powders is no less than 20 wt % of the total inorganic material powders including the other inorganic pigment powders.

7. A magnetic recording medium as defined in claim 6 in which the amount of the tin oxide type powders is no less than 40 wt % of the total inorganic material powders including the other inorganic pigment powders.

8. A magnetic recording medium as defined in claim 5 in which the mean particle size of the inorganic material powders including the tin oxide type powders is 0.01 to 0.8 micron.

9. A magnetic recording medium as defined in claim 8 in which the mean particle size of the inorganic material powders including the tin oxide type powders is 0.02 to 0.4 micron.

10. A magnetic recording medium as defined in claim 5 in which said inorganic pigment material is one or more selected from the group consisting of carbon black, graphite, tungsten disulfide, molybdenum disulfide, boron nitride, silicon dioxide, calcium carbonate, aluminum oxide, iron oxide, titanium oxide, magnesium oxide, zinc oxide, calcium oxide. lithopone and talc.

11. A magnetic recording medium as defined in claim 1 in which the ratio by volume of the total inorganic material powders to the binder is 1:99 to 60:40.

12. A magnetic recording medium as defined in claim 11 in which the ratio by volume of the total inorganic material powders to the binder is 5:95 to 50:50.

13. A magnetic recording medium as defined in claim 12 in which the ratio by volume of the inorganic material powders to the binder is 10:90 to 40:60.

14. A magnetic recording medium as defined in claim 1 in which the ratio by volume of the tin oxide type powder in the inorganic material powder to the binder is 10:90 to 30:70.

15. A magnetic recording medium as defined in claim 1 in which the organic binder includes thermoplastic resin or a mixture thereof.

16. A magnetic recording medium as defined in claim 1 in which the subbing layer has a thickness of 0.05 to 0.2 micron.

17. A magnetic recording medium as defined in claim 5 in which the subbing layer includes a binder and the ratio by volume of the total inorganic material powders to the binder is 1:99 to 60:40.

* * * * *